United States Patent
Gill et al.

(10) Patent No.: US 7,639,453 B2
(45) Date of Patent: Dec. 29, 2009

(54) PERPENDICULAR MAGNETIC WRITE HEAD WITH SHUNT STRUCTURE TO PREVENT READ SENSOR INTERFERENCE

(75) Inventors: Hardayal Singh Gill, Palo Alto, CA (US); Kuok San Ho, Santa Clara, CA (US); Wen-Chien David Hsiao, San Jose, CA (US); Yimin Hsu, Sunnyvale, CA (US); Edward Hin Pong Lee, San Jose, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 390 days.

(21) Appl. No.: 11/497,202

(22) Filed: Aug. 1, 2006

(65) Prior Publication Data

US 2008/0030897 A1    Feb. 7, 2008

(51) Int. Cl.
 *G11B 5/127* (2006.01)
(52) U.S. Cl. .................. 360/125.21; 360/125.3
(58) Field of Classification Search ................ 360/125.16–125.26, 125.01, 125.3, 125.71
See application file for complete search history.

(56) References Cited

U.S. PATENT DOCUMENTS

| 6,513,228 | B1* | 2/2003 | Khizroev et al. ......... 29/603.14 |
| 6,618,227 | B2* | 9/2003 | Yano et al. ............... 360/317 |
| 6,710,972 | B1 | 3/2004 | Mochizuki et al. ........ 360/123 |
| 6,809,899 | B1* | 10/2004 | Chen et al. ............ 360/125.13 |
| 2003/0223149 | A1 | 12/2003 | Kimura et al. ............. 360/125 |
| 2004/0080869 | A1 | 4/2004 | Thompson Rea et al. ... 360/126 |
| 2004/0212923 | A1 | 10/2004 | Taguchi ................... 360/125 |
| 2005/0068669 | A1 | 3/2005 | Hsu et al. ................. 360/125 |
| 2005/0135007 | A1* | 6/2005 | Nishikawa et al. ........ 360/126 |

FOREIGN PATENT DOCUMENTS

| JP | 11031305 | 2/1999 |
| JP | 2002100005 | 4/2002 |
| JP | 2003006814 | 1/2003 |
| JP | 2004185672 | 7/2004 |
| JP | 2004310968 | 11/2004 |

* cited by examiner

*Primary Examiner*—Andrea L Wellington
*Assistant Examiner*—Gustavo Polo
(74) *Attorney, Agent, or Firm*—Zilka-Kotab, PC

(57) ABSTRACT

A magnetic head structure for use in perpendicular magnetic recording. The magnetic head includes a magnetic write head having a return pole with a magnetic shunt structure extending from the back end opposite the ABS. The magnetic shunt structure prevents magnetic field from the write coil from reaching and affecting the read head. More specifically the shunt structure prevents magnetic field from the portion of the write coil beyond the back gap (as measured from the ABS) from magnetizing a magnetic shield of the read head. The shunt structure is also configured so as to avoid stray field writing. The size and shape of the shunt structure is therefore, limited to avoid attracting stray fields that might cause such stray field writing.

18 Claims, 4 Drawing Sheets

PERPENDICULAR MAGNETIC WRITE HEAD WITH SHUNT STRUCTURE TO PREVENT READ SENSOR INTERFERENCE

FIELD OF THE INVENTION

The present invention relates to perpendicular magnetic recording, and more particularly to a perpendicular write head structure that prevents the write head from interfering with the magnetoresistive read sensor.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

Traditionally, magnetic writing has been performed longitudinally on a magnetic disk. A longitudinal write head used in such recording systems includes a coil layer embedded in an insulation layer, the insulation layer being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks longitudinally on the moving media, such as in circular tracks on the aforementioned rotating disk.

In recent read head designs a spin valve sensor, also referred to as a giant magnetoresistive (GMR) sensor, have been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head, a single ferromagnetic layer functions as the second shield layer of the read head and as the first pole piece layer of the write head. In a piggyback head the second shield layer and the first pole piece layer are separate layers.

The ever increasing demand for increased data rate and data capacity has lead a relentless push to develop completely new recording systems capable of meeting these demands. As a result, researchers have focused on the use of perpendicular magnetic recording systems. Such recording systems operate by recording data as localized magnetizations on a magnetic disk that are oriented perpendicular to the surface of the disk rather than longitudinally. A perpendicular magnetic recording disk includes a magnetically soft underlayer and a thin magnetically hard top layer. It is this top layer that remains magnetized after data has been written. The magnetically soft underlayer acts as a magnetic conduit for conducting magnetic flux back to a return pole.

It turns out however, that magnetic disks suitable for perpendicular magnetic recording are susceptible to stray field writing. As a result, magnetic structures, such as those in the write head must be configured to prevent stray field writing. Structures such as shields and write poles must have a depth as measured from the ABS that is not too deep. This is to prevent the structure from acting as a magnetic antenna which might pick up stray fields and concentrate them at the disk, causing inadvertent writing.

However, this lack of shielding has reduced the magnetic isolation between the writer and read sensor. Magnetic fields from the portion of the write coil that extends beyond the write pole can reach the read sensor and be read as a signal. Field from the writer is picked up by the reader shield, causing the shield's magnetization to flip. This causes an unacceptable amount of signal noise, making the recording system impractical.

Therefore, there is a strong felt need for magnetic head design that can be used in magnetic recording while also preventing interference between the write head and the read sensor. Such a design should also prevent stray field writing to the disk.

SUMMARY OF THE INVENTION

The present invention provides a write head structure for perpendicular magnetic recording that prevents magnetic field from the write head from reaching and affecting the read head. The write head includes a return pole having a front end near the air bearing surface (ABS), a back end opposite the front end and has a shunt structure that extends from the back end of the return pole.

The shunt structure is configured to be large enough to prevent magnetic field from the write coil from reaching the read head, but is small enough not to cause stray field writing. With this in mind, the shunt structure can have a thickness (measured parallel with the ABS) that is less than the thickness of the return pole, and that is preferably not greater than ¾ of the return pole thickness. The shunt structure may have a thickness of 0.08-0.5 um and a height measured away from the ABS of 5-10 um.

The shunt structure can be constructed of a magnetic material such as NiFe and can be advantageously easily incorporated into the build of the write head, with little or no additional expense.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
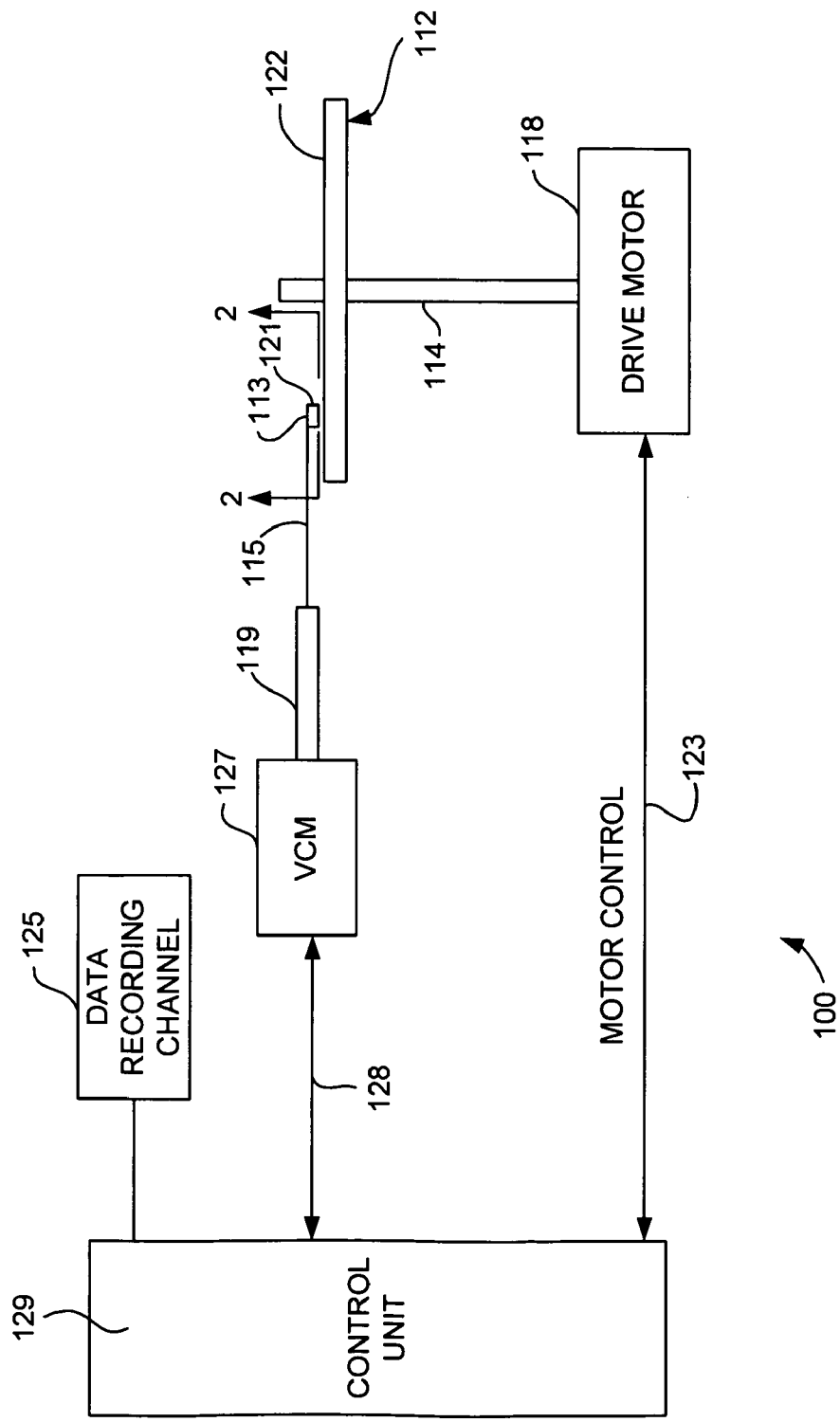
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
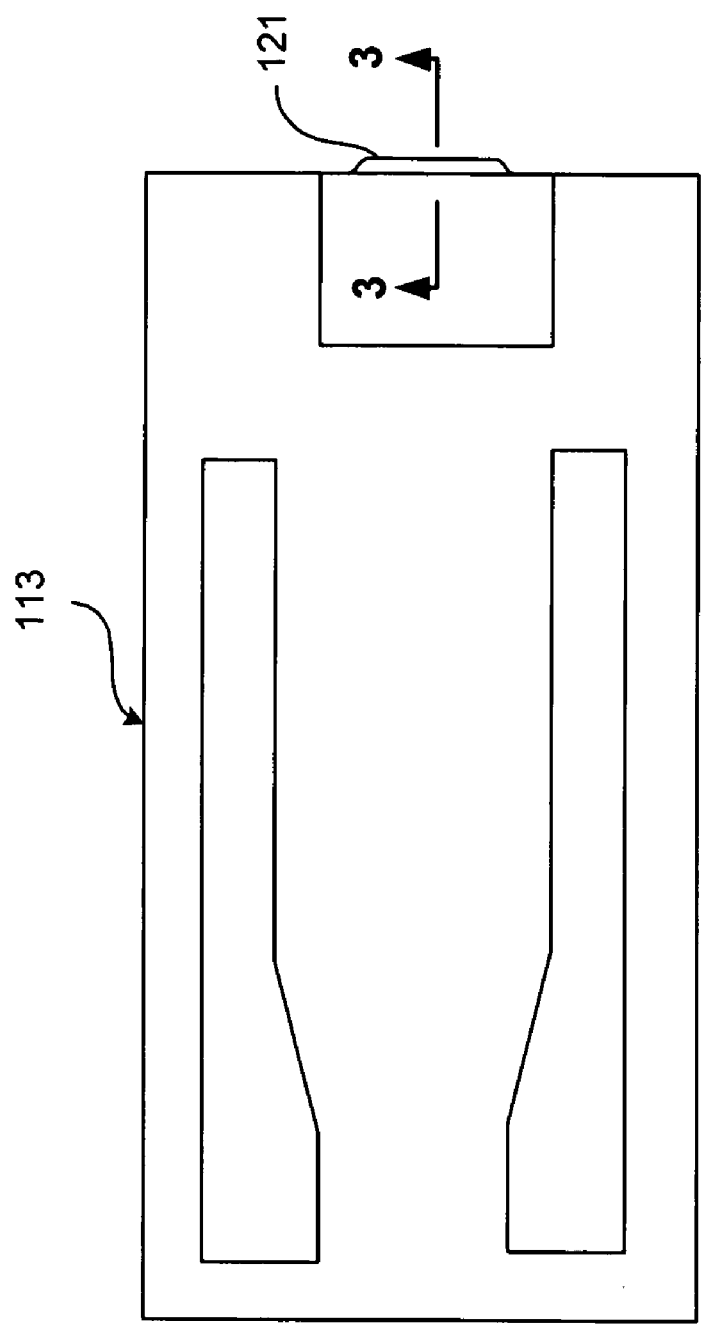
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
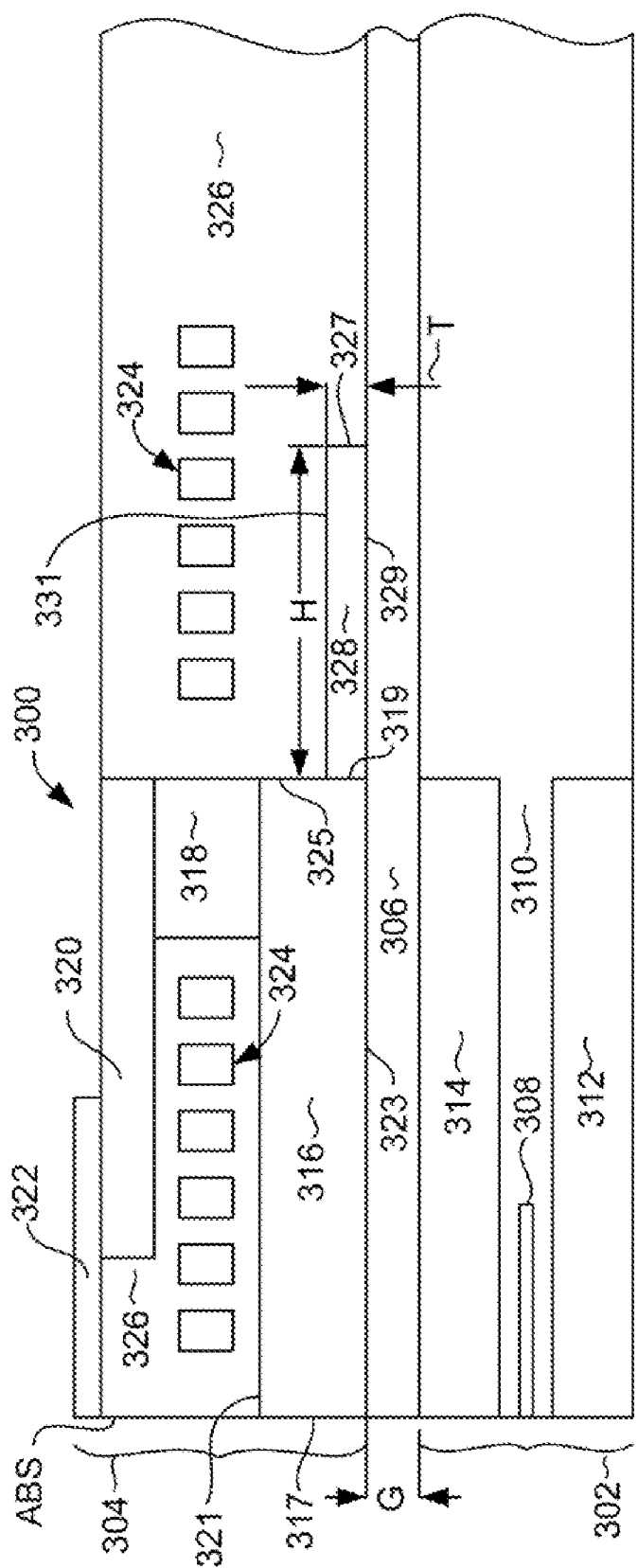
FIG. 3 is an enlarged cross sectional view taken from line 3-3 of FIG. 2 illustrating write and read heads according to an embodiment of the invention.

With reference now to FIG. 3, a cross sectional view of a magnetic head 300 includes a read head 302 and a write head 304. The read head 302 and write head 304 are separated by a non-magnetic, electrically insulating gap layer 306, which may be, for example alumina ($Al_2O_3$). The read and write heads 302, 304 have an air bearing surface (ABS) which is the surface to be disposed toward a magnetic medium (not shown in FIG. 3) when in use.

The read head 302 includes a magnetoresistive sensor 308, such as a giant magnetoresistive sensor (GMR) or a tunnel valve. The sensor 308 is embedded in a non-magnetic, electrically insulating gap material 310, which again can be alumina. First and second magnetic shields 312, 314, constructed of a magnetic material such as NiFe are provided at either side (above and below) the sensor 308.

The write head 304 includes a return pole 316, back gap layer 318, shaping layer 320 and write pole 322. The return pole 316, back gap 318 and shaping layer 320 can be constructed of a magnetic material such as NiFe. The write pole 322 can be constructed of a high saturation (high Bsat) material, such as CoFe, but is preferably constructed as a lamination of layers of high Bsat material such as CoFe separated by thin non-magnetic layers such as. The return pole 316 is magnetically connected to the back gap layer 318 and the back gap is magnetically connected with the shaping layer 320. The shaping layer 320 is magnetically connected with the write pole 322.

The magnetic head 300 has a trailing direction which up as viewed in FIG. 3 and a leading direction which is down as viewed in FIG. 3. The terms leading and trailing refer to the direction of travel relative to a disk (not shown) over which the head 300 flies during use. Therefore, the return pole 316 has an ABS end 317 located at the ABS, a back end 319 opposite the ABS end, a trailing surface 321 that extends from the back end 319 to the ABS end 317 at the trailing edge of the return pole 316 and a leading surface 323 that extends from the back end 319 to the ABS end 317 at the leading edge of the write pole 316.

An electrically conductive write coil 324, shown cross section in FIG. 3, passes between the shaping layer 322 and write pole 322 and the return pole 316. The write coil 324 is what has been referred to as a pancake coil, because it has a flat shape, that extends out of and into the page as shown in FIG. 3. The coil 324 wraps around the back gap, so that it extends behind the write pole structure defined by the return pole 316, back gap 318, shaping layer 320 and write pole 322. The write coil 324 is embedded in an insulation layer 326 that can be, for example alumina ($Al_2O_3$).

As discussed above in the Background of the Invention, a problem that has been experienced with prior art perpendicular heads is that magnetic field from the write coil 324 can be picked up by the read head shield 314, which affects the sensor 308. Magnetic fields from the portion of the coil 324 that pass over the return pole 316 are not as much of a problem, because the return pole 316 acts as a magnetic shield to absorb the field from this portion of the coil 324. However, magnetic field 326 from portions of the coil located behind the back gap 318 can cause such interference.

To ameliorate this problem, a magnetic shunt 328 is provided at the back of the pole structure. The shunt can be constructed of a magnetic material such as NiFe or some other material, and preferably extends from the back edge of the return pole, although the shunt 328 could extend from the back of the back gap as well. The shunt attracts and absorbs magnetic field from the write coil 324. The shunt is located at a level in the head stack such that it is disposed between at least a portion of the coil and the read head 302.

The shunt 328 has a front end 325 where it connects with the return pole 316 (the end closest to the ABS) and a back end 327 opposite the front end (ie. furthest from the ABS). The shunt also has leading and trailing surfaces 329, 331 that extend from the back end to the front end. The shunt 328 has a thickness T measured parallel to the ABS in a down track direction and which can be defined as the distance between the leading and trailing surfaces 329, 331, and has a length or height H measured perpendicular to the ABS as the distance from the front 325 end to the back end 327. The shunt 328 can be of various thicknesses, but preferably has a thickness T that is smaller than the thickness of the return pole 316. The shunt preferably has a thickness T that is no greater than ¾ the thickness of the return pole or that is 0.08 to 0.5 um.

The shunt can have various heights H, but preferably has a height H that is large enough to prevent field from the coil 324 from affecting the read head 302, but also small enough to avoid stray field writing. If the shunt 324 is too large it could act as a magnetic antenna to absorb stray magnetic fields which can collect at the ABS and cause inadvertent stray field writing to the magnetic medium. Therefore, the shunt preferably has a height H of 5 to 10 um, although the exact measurements depend upon the design requirements of a particular recording system and on the relative size of the write and read heads 302, 304.

To further prevent interference between the coil 324 and the read head 320, the size of gap between the read and write heads 302, 304 can be increased.

Figure 4:
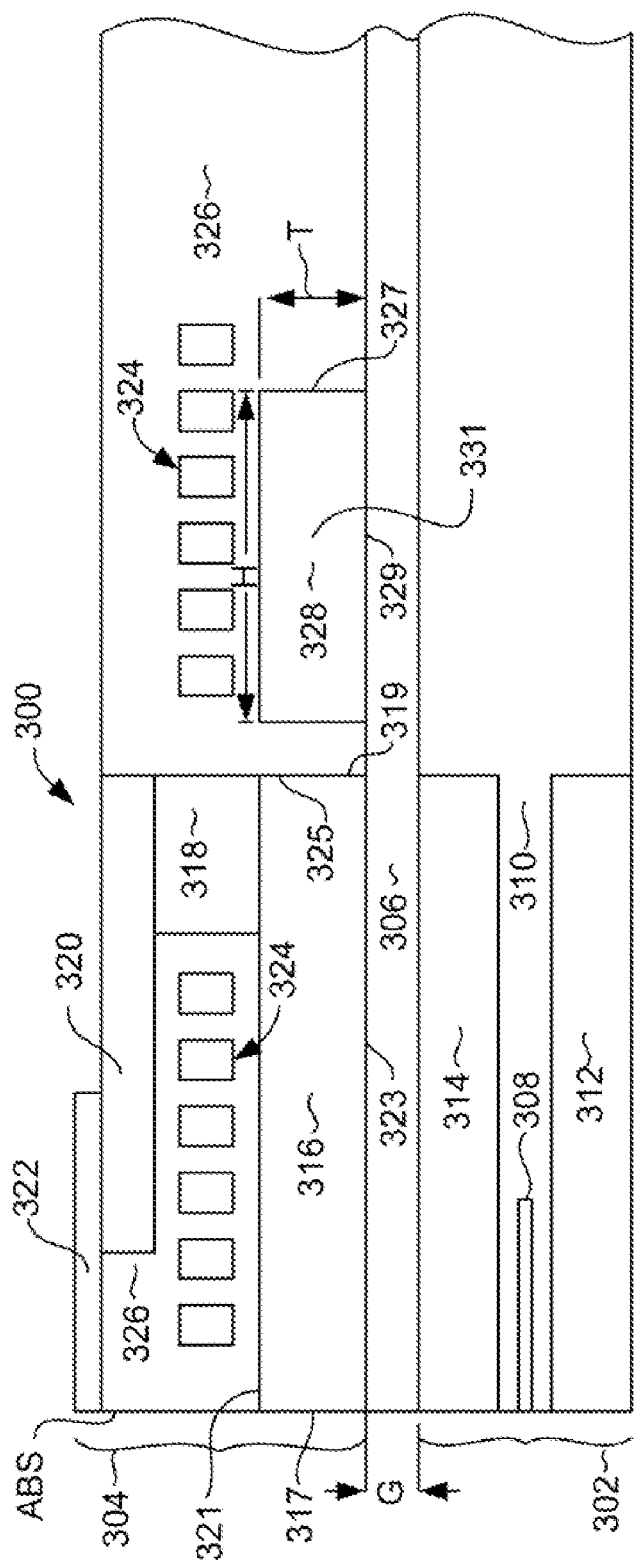
FIG. 4 is an enlarged cross sectional view of read and write heads according to an alternate embodiment of the invention.

With reference now to FIG. 4, an alternate embodiment of the invention includes a shunt 402 that is separated from the return 316 pole by a gap 404. In this embodiment of the invention, the shunt 406 can be constructed to have a thickness T that is as thick as the return pole 316. The gap 404 allows the shunt 402 to be constructed thicker than in the previous embodiment while still avoiding stray field writing. If further protection against stray field writing is desired, the shunt 404 can be constructed with a thickness T that is thinner than that of the return pole 316. Either of the shunt structures 328, 402 can be constructed by electroplating in the same masking and plating step as that used to construct the return pole 316. However, making the shunt 402 the same thickness as the return pole 316 makes it much easier to plate the shunt 402 simultaneously with the return pole 316.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, the write head comprising:
    a magnetic return pole having an ABS end disposed at an air bearing surface (ABS) and a back end opposite the ABS; and
    a magnetic shunt extending from the back end of the return pole, the shunt extending in a direction away from the ABS; wherein
    the return pole has a trailing surface and a leading surface opposite the trailing surface the leading and trailing surfaces extending from the back end to the ABS end, the distance between the leading and trailing surfaces of the return pole defining a return pole thickness;
    the shunt has a leading surface, and a trailing surface, the distance between the leading and trailing surfaces of the shunt defining a shunt thickness; and
    the shunt thickness is less than the return pole thickness.

2. A magnetic write head as in claim 1, wherein:
    the shunt has a leading surface and a trailing surface, the distance between the leading and trailing surfaces of the shunt defining a shunt thickness (T);
    the shunt has a height (H) measured perpendicular to the ABS; and
    T is 0.08-0.5 um, and H is 5-10 um.

3. A magnetic write head as in claim 1 wherein the shunt comprises NiFe.

4. A magnetic write head for perpendicular magnetic recording, the write head comprising:
    a magnetic return pole having an ABS end located adjacent to an air bearing surface (ABS), a back end opposite the ABS end, a trailing surface extending from the back end to the ABS end, and a leading surface extending from the back end to the ABS end;
    a magnetic back gap layer connected with the trailing surface of the return pole near the back end of the return pole;
    a magnetic shaping layer magnetically connected with the back gap;
    a write pole magnetically connected with the shaping layer;
    an electrically conductive coil, a portion of which passes between the return pole and the shaping layer, the coil wrapping around the back gap to extend beyond the back end of the return pole; and
    a magnetic shunt, extending from the back end of the return pole in a direction away from the ABS; wherein
    the shunt has a trailing surface and a leading surface opposite the trailing surface, the distance between the leading and trailing surfaces defining a shunt thickness;
    the distance between the trailing and leading surfaces of the return pole defines a return pole thickness; and
    the shunt thickness is less than the return vole thickness.

5. A magnetic write head as in claim 4, wherein the shunt comprises NiFe.

6. A magnetic write head as in claim 4 wherein the distance between the leading and trailing surfaces defining a thickness T, and wherein T is 0.08-0.5 um and H is 5 to 10 um.

7. A magnetic write head as in claim 4 wherein:
the shunt thickness is no greater than ¾ of the return pole thickness.

8. A magnetic head for use in perpendicular magnetic recording, the magnetic head comprising;
 a read head, including a magnetoresistive sensor disposed between first and second magnetic shields;
 a write head, comprising:
  a magnetic return pole having an ABS end located at an air bearing surface (ABS), a back end opposite the ABS end, a leading surface extending from the back end to the ABS end, and a trailing surface opposite the leading surface extending from the back end to the ABS end;
  a magnetic back gap layer magnetically connected to the trailing surface of the return pole near the back end;
  a magnetic shaping layer magnetically connected with the back gap layer opposite the return pole;
  a magnetic write pole magnetically connected with the shaping layer and extending to the ABS;
  an electrically conductive write coil a portion of which passes between the shaping layer and the return pole, and which wraps around the back gap layer to extend beyond the back end of the return pole; and
  a magnetic shunt magnetically connected with and extending from the back end of the return pole;
  wherein the shunt has a leading surface and a trailing surface defining a shunt thickness measured therebetween, and wherein the distance between the trailing surface of the return pole and the leading surface of the return pole defines a return pole thickness, and wherein the shunt thickness is less than the return pole thickness.

9. A magnetic head as in claim 8 wherein the shunt is disposed between at least a portion of the write coil and the read head.

10. A magnetic head as in claim 8 wherein the shunt thickness is no greater ¾ of the return pole thickness.

11. A magnetic head as in claim 8 wherein the shunt has a leading surface and a trailing surface defining a shunt thickness measured therebetween and has a front end connected with the return pole and a back end opposite the front end, the distance between the front end and the back end defining a shunt height and wherein the shunt thickness and shunt height are chosen to prevent magnetic field from the write coil from affecting the read head, and also to prevent stray field writing from the write head to the media.

12. A magnetic head as in claim 8 wherein the shunt has a leading surface and a trailing surface defining a shunt thickness measured therebetween and has a front end connected with the return pole and a back end opposite the front end, the distance between the front end and the back end defining a shunt height and wherein the shunt thickness is 0.08-0.5 um and the shunt height is 5-10 um.

13. A magnetic head as in claim 8 wherein the magnetic shunt comprises NiFe.

14. A magnetic head as in claim 8 wherein the return pole and the shunt both comprise NiFe.

15. A magnetic head as in claim 8 wherein the return pole, back gap, shaping layer and shunt comprise NiFe, and wherein the write pole comprises a laminate structure including layers of magnetic material separated by thin layers of non-magnetic material.

16. A magnetic head as in claim 8 wherein the shunt and the write coil are separated by a non-magnetic, electrically insulating material.

17. A magnetic head as in claim 8 wherein the shunt and the write coil are separated from one another by a layer of alumina.

18. A magnetic head as in claim 1 wherein the shunt is magnetically connected with the return pole.

* * * * *